United States Patent
Thrun et al.

(10) Patent No.: US 10,061,285 B1
(45) Date of Patent: Aug. 28, 2018

(54) ENCODING A CUSTOM COOKING PROGRAM

(71) Applicant: Silicon Valley Factory LLC, Los Altos Hills, CA (US)

(72) Inventors: Sebastian Thrun, Los Altos, CA (US); David St. Martin, San Rafael, CA (US); Arash Kani, Roxbury, MA (US)

(73) Assignee: Silicon Valley Factory LLC, Los Altos Hills, CA (US)

( * ) Notice: Subject to any disclaimer, the term of this patent is extended or adjusted under 35 U.S.C. 154(b) by 0 days.

(21) Appl. No.: 15/489,468

(22) Filed: Apr. 17, 2017

(51) Int. Cl.
  G05D 23/00 (2006.01)
  G05B 19/042 (2006.01)
  H05B 6/64 (2006.01)

(52) U.S. Cl.
  CPC ......... *G05B 19/042* (2013.01); *H05B 6/6447* (2013.01); *G05B 2219/2643* (2013.01)

(58) Field of Classification Search
  CPC .......... G05B 19/042; G05B 2219/2643; H05B 6/6447
  See application file for complete search history.

(56) References Cited

U.S. PATENT DOCUMENTS

| | | | |
|---|---|---|---|
| 3,530,499 A | 9/1970 | Schroeder | |
| 4,323,773 A | 4/1982 | Carpenter | |
| 4,381,438 A | 4/1983 | Goessler | |
| 4,749,836 A | 6/1988 | Matsuo et al. | |
| 4,913,038 A | 4/1990 | Burkett | |
| 5,045,333 A | 9/1991 | Petrofsky | |
| 5,877,477 A | 3/1999 | Petty | |
| 6,660,983 B2 | 12/2003 | Monforton | |
| 6,740,855 B1 * | 5/2004 | DeCobert | A47J 27/004 219/429 |
| 8,191,465 B2 | 6/2012 | Sager | |
| 8,207,479 B2 | 6/2012 | Ben-Shmuel | |
| 8,835,816 B2 | 9/2014 | McIntyre | |
| 9,414,442 B2 | 8/2016 | Torres | |
| 9,528,972 B2 | 12/2016 | Minvielle | |
| 9,606,522 B2 | 3/2017 | Hoffman | |
| 9,644,847 B2 | 5/2017 | Bhogal | |
| 2004/0018278 A1 | 1/2004 | Popplewell | |
| 2007/0092670 A1 | 4/2007 | Quella | |
| 2007/0137633 A1 | 6/2007 | McFadden | |
| 2007/0278221 A1 | 12/2007 | Skaife | |

(Continued)

FOREIGN PATENT DOCUMENTS

| EP | 1422163 | 5/2004 |
|---|---|---|
| JP | 2006153432 | 6/2006 |

OTHER PUBLICATIONS

RF Solid-State Technology with Goji. http://www.gojifoodsolutions.com/rf-cooking-technology. Jan. 29, 2017.

(Continued)

*Primary Examiner* — Toan Le
(74) *Attorney, Agent, or Firm* — Van Pelt, Yi & James LLP (57) ABSTRACT

In various embodiments, a method of encoding a custom cooking program includes receiving at least one sensor reading associated with food, determining at least one characteristic of the food based on the at least one sensor reading, generating cooking instructions for the food based on the at least one characteristic, and storing data that associates the cooking instructions with the food.

20 Claims, 7 Drawing Sheets

(56) References Cited

U.S. PATENT DOCUMENTS

| | | |
|---|---|---|
| 2008/0083338 A1 | 4/2008 | Niemetz |
| 2008/0105134 A1 | 5/2008 | Elston, III |
| 2008/0108388 A1 | 5/2008 | Ebrom |
| 2009/0188396 A1 | 7/2009 | Hofmann |
| 2009/0194526 A1 | 8/2009 | Buchanan |
| 2009/0208615 A1 | 8/2009 | Domingues |
| 2009/0236334 A1 | 9/2009 | Ben-Shmuel |
| 2010/0213187 A1 | 8/2010 | Bandholz |
| 2010/0320189 A1 | 12/2010 | Buchheit |
| 2011/0303652 A1 | 12/2011 | Sano |
| 2012/0063753 A1 | 3/2012 | Cochran |
| 2013/0092032 A1 | 4/2013 | Cafferty |
| 2013/0269539 A1 | 10/2013 | Polt |
| 2013/0306627 A1 | 11/2013 | Libman |
| 2014/0263640 A1* | 9/2014 | Heit .................. G06K 7/00 235/435 |
| 2014/0377417 A1 | 12/2014 | Martinez |
| 2015/0057773 A1 | 2/2015 | Minvielle |
| 2016/0198885 A1* | 7/2016 | Logan .................. A47J 27/62 99/325 |
| 2016/0220064 A1* | 8/2016 | Young .................. A47J 36/00 |
| 2016/0295640 A1* | 10/2016 | De Samber ............. F24C 7/087 |
| 2016/0327279 A1 | 11/2016 | Bhogal |
| 2016/0355287 A1 | 12/2016 | Keller |
| 2017/0016623 A1* | 1/2017 | Rabie .................. F24C 7/088 |
| 2017/0135383 A1* | 5/2017 | Liss .................... A23L 5/10 |

OTHER PUBLICATIONS

Author Unknown, "Induction Heating", from Wikipedia, the free encyclopedia. Last modified Jan. 10, 2017.

Butz et al., "Recent Developments in Noninvasive Techniques for Fresh Fruit and Vegetable Internal Quality Analysis", from R: Concise Reviews in Food Science, published Nov. 21, 2005.

Translation of JP2006153432A, Nozawa et al, Heating Cooker Information medium and program, Jun. 15, 2006, ProQuest, Mar. 25, 2018.

* cited by examiner

| NUMBER OF BITS | ENCODING |
|---|---|
| 10 | EXPIRATION DATE |
| 10 | FOOD TYPE/CHARACTERISTIC(S) |
| < 42 | HEATING SCHEDULE |
| 10 | TIME TO PROVIDE SECONDARY SUBSTANCE |
| 10 | SECURITY MECHANISM |
| 14 | MISCELLANEOUS |

ENCODING A CUSTOM COOKING PROGRAM

BACKGROUND OF THE INVENTION

There are many challenges in food preparation. Cooking can be time-consuming and messy. For example, ingredient selection, acquisition, transportation, and preparation can be inconvenient. In spite of the effort expended, sometimes the results of meal preparation are unsatisfying. Successfully extracting flavors from ingredients typically requires lengthy cooking processes such as stewing or skilled processes such as browning. The final tastiness of food depends on the characteristics of the ingredients and a person's tastes and preferences.

Pre-packaged chilled convenience meals have been popular since the 1950's for its ease of preparation. Typical convenience meals are packaged in a tray and frozen. The consumer heats the meal in an oven or microwave and consumes the food directly from the tray. However, conventional pre-packaged convenience meals might be unhealthy and not tasty, and results may vary depending on the microwave or oven used to heat the meal. For example, the food might be heated unevenly.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method of encoding a custom cooking program is disclosed. In various embodiments, the method includes receiving at least one sensor reading associated with food. At least one characteristic of the food is determined based on the at least one sensor reading. Cooking instructions are generated for the food based on the at least one characteristic, where the cooking instructions includes a sequence of cooking phases. In various embodiments, the cooking phases are defined by one or more of a duration of a phase, an energy level for the phase, and/or a response to an event that occurs during at least one of the cooking phases. In various embodiments, the cooking instructions are stored.

Figure 1:
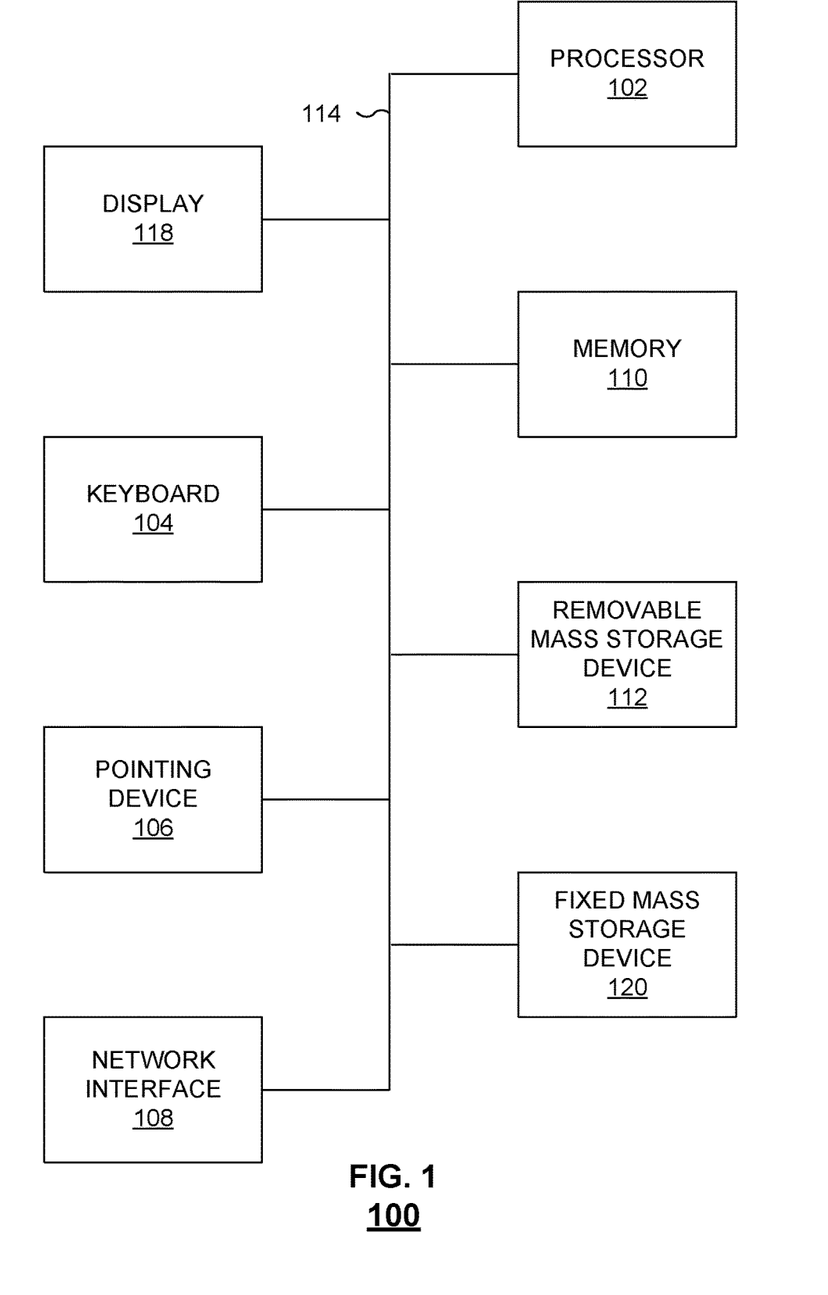
FIG. 1 is a functional diagram illustrating a programmed computer system for encoding a custom cooking program in accordance with some embodiments.

FIG. 1 is a functional diagram illustrating a programmed computer system for encoding a custom cooking program in accordance with some embodiments. As will be apparent, other computer system architectures and configurations can be used to encode a custom cooking program. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to execute/perform the processes described below with respect to FIGS. 2 and 5.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or unidirectional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
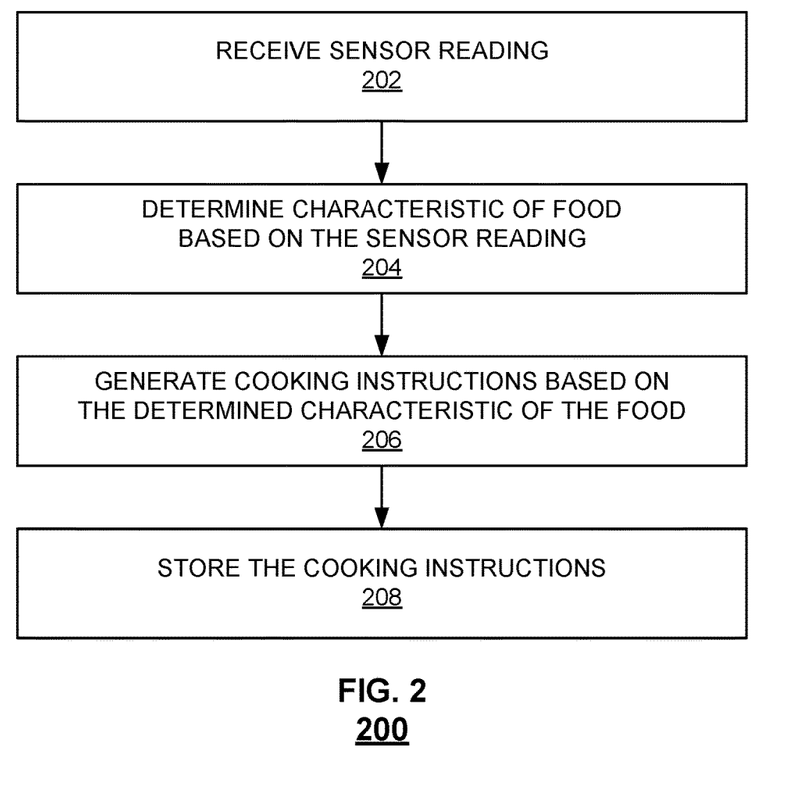
FIG. 2 is a flowchart illustrating an embodiment of a process to encode a custom cooking program.

FIG. 2 is a flowchart illustrating an embodiment of a process 200 to encode a custom cooking program. In various embodiments, the custom cooking program is adapted for ingredients whose characteristics are measured by sensors. In various embodiments, the process 200 may be implemented by a processor such as processor 102 of FIG. 1.

At 202, at least one sensor reading is received. In some embodiments, a controller directs sensors to make the sensor readings. In various embodiments, the sensor readings include information about food. For example, the sensor readings may include physical aspects of the measured food. From the sensor readings, other information such as freshness and nutritional value of the food may be derived. The sensor reading may be useful for packaging and encoding cooking instructions for the food among other things. In one aspect, the sensor measurement of the food indicates particular characteristics of a specific piece or portion of food. This may allow cooking instructions to be adapted for the specific piece or portion of food.

The sensor reading may include information about the weight and/or volume of the food. The sensor reading may include characteristics of food detected by spectroscopy. The sensor reading may include image analysis of the food. By way of non-limiting example, image analytics include colorimetry, images captured by a camera (e.g., charge coupled device (CCD), CMOS, multispectral, hyperspectral, cameras, etc.), ultrasound, MRI/NMR (nuclear magnetic resonance), CT, electrical tomography, X-Ray/T-Ray/Gamma-ray, and infrared. The sensor reading may include fluorescence and delayed light emission (DLE). The sensor reading may include near-infrared spectrophotometry such as readings collected by a fiber-optic probe. The sensor reading may include terahertz radiation readings, thermal radiation readings, gas analysis, and chemical sensors (e.g., sniffer).

At 204, at least one characteristic of food is determined based on the received sensor reading(s). In various embodiments, the sensor reading indicates at least one of: shape, size, volume, thickness, and weight of the measured food. In various embodiments, the sensor reading indicates color of the food. The color of the food may indicate freshness, quality, and taste (e.g., sweetness, tartness, etc.). In various embodiments, the sensor reading determines age or expiration date of the food. For example, a piece of food may arrive with a tag indicating when that piece of food was harvested or caught. As another example, an approximate harvest or catch date may be deduced based on characteristics of the food. In various embodiments, sensor readings about water content may indicate maturity, defects, decay, and/or quality of the measured food. In various embodiments, sensor readings indicate nutritional value of the food. For example, protein content, lipid content, and carbohydrate content may be measured and/or determined from sensor readings.

In particular, electrical tomography readings (e.g., R, C, I changes) may indicate meat quality such as tenderness or age of the meat. Fluorescence and DLE readings may indicate vegetable quality based on chlorophyll content and photosynthesis characteristics. Near-infrared spectrophotometry may indicate firmness, freshness, Brix value (e.g., sugar content of an aqueous solution), acidity, color, fat content, water content, protein content, nitrogen content, sugar content, alcohol content, etc. Terahertz radiation readings may indicate fat content and ripeness of food and, in some cases, is a safer alternative to X-rays and Gamma-rays. MRI/NMR readings may indicate fat content and water content. X-rays may indicate degradation of food such as rotting, bruising, or freezer damage. Mechanical, sonic, and/or ultrasound measurements may indicate firmness, elasticity, shape, and density. For example, a laser air-puff detector can determine a firmness of food. An impulse response may measure elasticity, internal friction or damping, shape, and size density. Tissue properties may be evaluated based on wave velocity, attenuation, and reflection.

In some embodiments, a characteristic of food is determined from a sensor reading for the food, e.g., a direct measurement of the food. In some embodiments, a characteristic of food is determined from sensor readings for other foods associated with the food, e.g., a batch of goods or adjacent pieces of food.

Figure 3A:
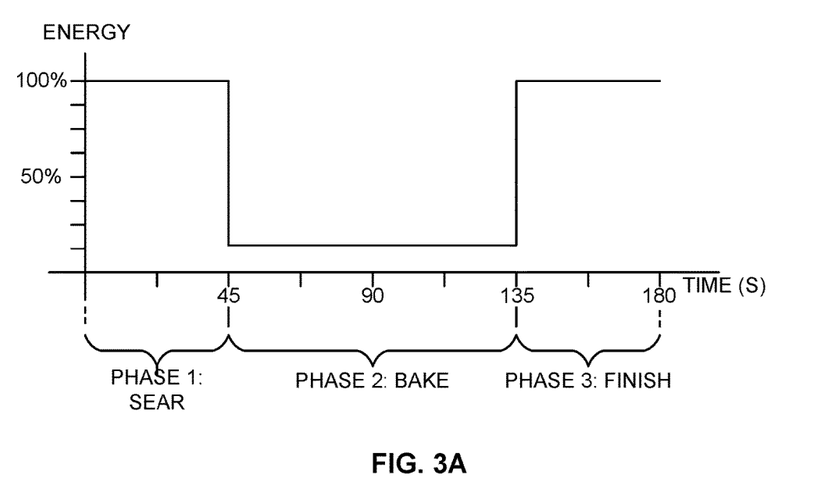
FIG. 3A is a block diagram illustrating an embodiment of a cooking schedule.

At 206, cooking instructions are generated based on the determined characteristic(s) of the food. In various embodiments, cooking instructions include one or more phases, duration of each phase, and/or energy level for each phase, etc. For example, the cooking instructions may be provided as a recipe or schedule (e.g., a sequence of heating cycles) in which the food is heated at a particular temperature/energy for a defined duration of time. An example of a cooking schedule is shown in FIG. 3. The cooking instructions may be adapted for a heating apparatus such as heating apparatus 700 of FIG. 7.

At 208, the cooking instructions are recorded. In various embodiments, the cooking instructions are recorded on an electronic tag such as tag 624 of FIG. 6 as further described herein. In various embodiments, the cooking instructions are stored in a server and can be looked up using an identification provided with packaged food. For example, in various embodiments, the cooking instructions are stored with association(s) to packages and when a query is provided with an identification of a package, the instructions are retrieved. The stored cooking instructions may be read and executed by a heating apparatus such as heating apparatus 700 of FIG. 7.

Figure 3B:
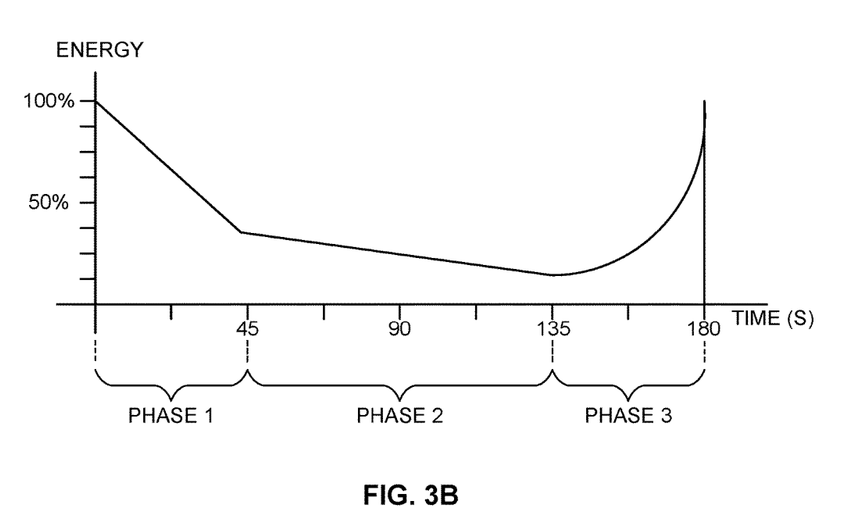
FIG. 3B is a block diagram illustrating an embodiment of a cooking schedule.

FIG. 3A is a block diagram illustrating an embodiment of a cooking schedule. The cooking schedule may be determined by decoding a custom cooking program. In the examples of FIGS. 3A and 3B, the cooking schedule is represented by a graph, wherein the x-axis is time in seconds and the y-axis is energy level. The energy level is given by the energy that a heating apparatus is capable of providing, e.g., field per unit volume of the material being heated up, heat per unit volume of material, temperature, etc.

The example cooking schedule shown in FIG. 3A takes three minutes and includes three phases: first searing at 100% energy for 45 seconds, then baking at 12.5% energy for 90 seconds, and finally finishing at 100% energy for 45 seconds. In various embodiments, this cooking schedule is determined from food characteristics.

The example cooking schedule shown in FIG. 3B illustrates that an energy level during a phase need not be uniform. In this example, in phase 1, energy is linearly decreased from 100% to around 27%. In phase 2, energy is linearly decreased from around 27% to around 12.5%. In phase 3, energy is exponentially increased from around 12.5% to 100%.

In various embodiments, the cooking schedule is adapted to a type of food. For example, in various embodiments, steak has a particular cooking profile/schedule such as sear, bake, and finish; fish has another cooking profile/schedule such as steam at 50% energy; carrots have another cooking profile/schedule such as steam at 75% energy, peas have another cooking profile/schedule such as steam at 25% energy. Each type of food may also have a variety of preparation of methods. For example, carrots can be steamed or sautéed and each method of preparation may have a different cooking schedule.

In various embodiments, the cooking schedule is adapted to characteristics of a specific piece of food. For example, in various embodiments, salmon has a generic baseline cooking schedule. The baseline cooking schedule can be adjusted for a particular piece of salmon to accommodate the specific characteristics of the salmon such as thickness, tenderness, etc. A salmon filet that is thicker than an average salmon filet can be heated for a longer time. A piece of meat that is tougher than an average piece of meat can be stewed for a longer time, at a lower temperature (compared with a temperature used for an average piece of meat), and/or at a higher pressure to achieve a desired level of tenderness. The heating schedule may be encoded (e.g., on an electronic tag or stored on a server) by representing the schedule as a number of phases, duration of each phase, and energy level for each phase, etc.

Figure 4:
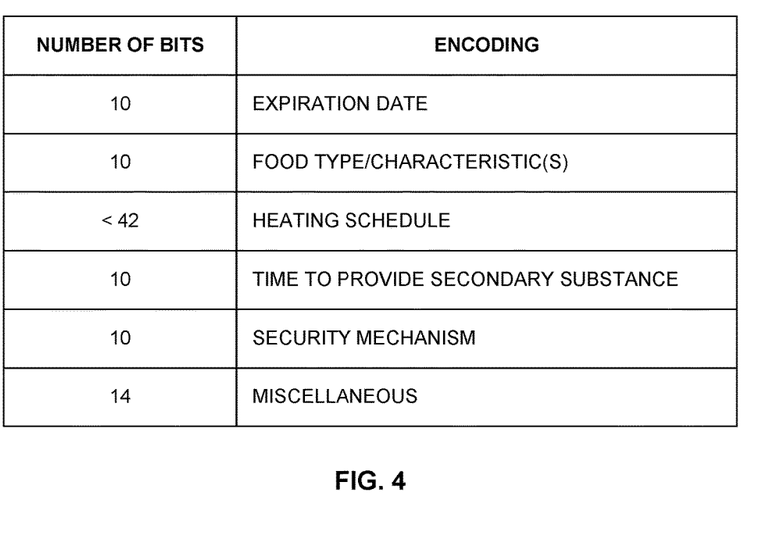
FIG. 4 is a table illustrating an embodiment of encoding a custom cooking program.

FIG. 4 is a table illustrating an embodiment of encoding a custom cooking program. In various embodiments, the cooking program is customized for and associated with a particular food. The custom cooking program may be stored in a pre-defined number of bits. In this example, a custom cooking program is stored using no more than 96 bits. For example, in various embodiments, 10 bits are allocated for storing an expiration date of the food, 10 bits are allocated for storing a food type and/or characteristic(s) of the food such as characteristics determined at 204 of process 200 in FIG. 2, no more than around 42 bits are allocated for storing a heating schedule such as the schedule of FIG. 3, 10 bits are allocated for storing a time to provide a secondary substance such as the time when a sauce is released, 10 bits are allocated for a security mechanism such as a secrecy code, and 14 bits (or a remainder of the bits) are allocated for miscellaneous functions. With respect to the around 42 bits for storing the heating schedule, 10 bits may be allocated for the duration of one or more phases, 3 bits may be allocated for a heat level for each of the phases, and 1 bit may be allocated for an event. For example, in various embodiments, an event is an evaluation of feedback received during a cooking process that can alter subsequent phases in the cooking process.

Figure 5:
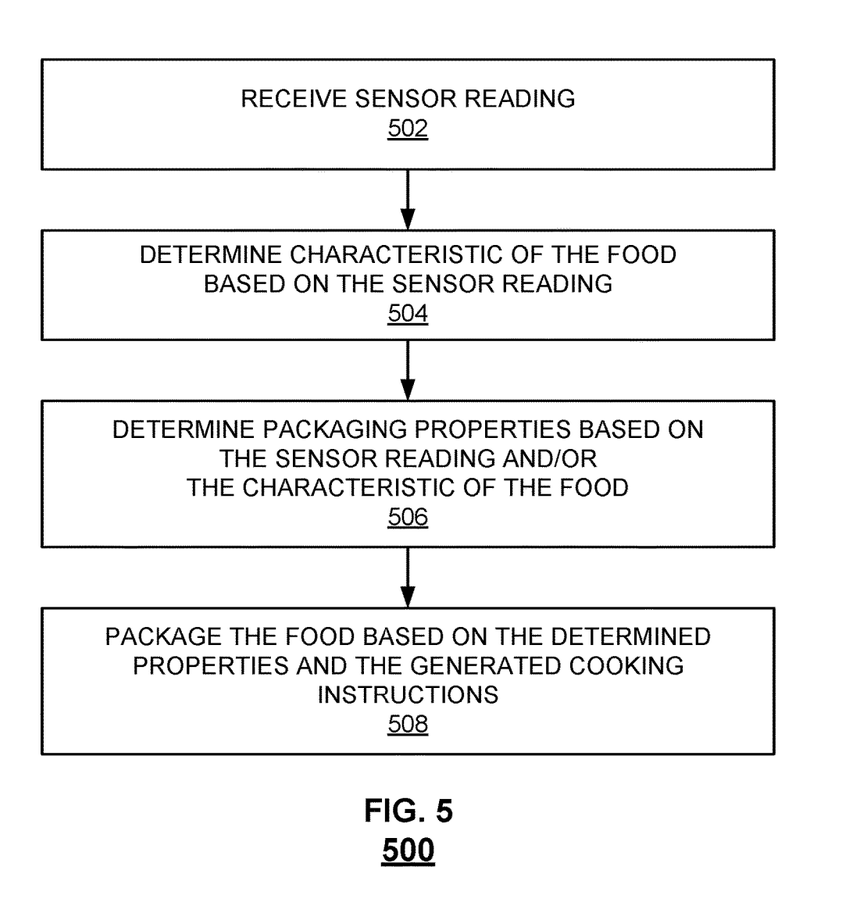
FIG. 5 is a flowchart illustrating an embodiment of a process to package food.

FIG. 5 is a flowchart illustrating an embodiment of a process 500 to package food. In various embodiments, the process 500 may be implemented by a processor such as processor 102 of FIG. 1.

At 502, at least one sensor reading is received. An example of collection and receipt of sensor readings is described with respect to 202 of FIG. 2.

At 504, at least one characteristic of food is determined based on the received sensor reading(s). An example of determination of food characteristics is described with respect to 204 of FIG. 2.

At 506, packaging properties are determined based on the sensor reading and/or characteristic of the food. For example, packaging properties may include how much water to inject into a membrane. The membrane may release or absorb water during a cooking process. As another example, packaging properties include what type of membrane to use. The membrane may absorb water during a cooking process. For example, packaging properties may include what type of metal layer to user, what type of material to use for chamber, and sizing of the chamber to accommodate heating. Each of these components is further described herein with respect to FIG. 6.

At 508, food is packaged based on the determined properties. In various embodiments, the cooking instructions are stored on an electronic tag such as tag 624 of FIG. 6 as further described herein.

In some embodiments, process 500 includes determining cooking instructions (not shown). The food is packaged based at least in part on the determined cooking instructions. For example, in various embodiments, packaging is selected for the food to accommodate the cooking methods. Suppose the cooking instructions includes stewing beef. The food is packaged in a chamber suitable for stewing such as a relatively deep bowl.

Figure 6:
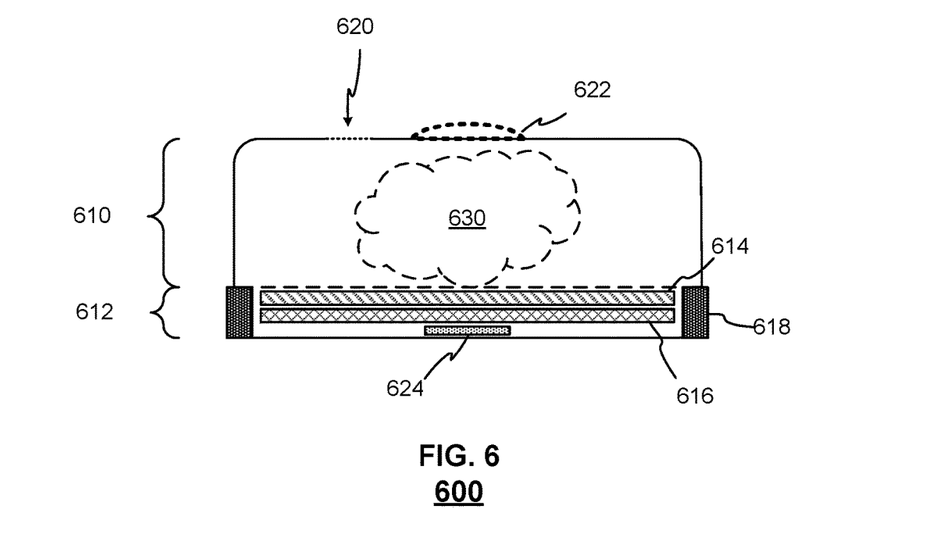
FIG. 6 is a block diagram illustrating an embodiment of an apparatus to store and transport matter.

FIG. 6 is a block diagram illustrating an embodiment of an apparatus 600 to store and transport matter 630. For example, in various embodiments the apparatus 600 is adapted to store and transport matter 630 comprising food or other heatable loads. The apparatus 600 includes a top portion 610, a bottom portion 612, a metal layer 614, a membrane 616, a seal 618, and a pressure relief valve 620.

The bottom portion 612 is adapted to receive matter 630. The bottom portion holds food or other types of loads. For example, the bottom portion may be a plate or bowl. As further described herein, a user may directly consume the matter 630 from the bottom portion 612.

The top portion 610 is adapted to fit the bottom portion 612 to form a chamber. For example, the top portion may be a cover for the bottom portion. In some embodiments, the top portion is deeper than the bottom portion and is a dome, cloche, or other shape. Although not shown, in some embodiments, the top portion is shallower than the bottom portion. In some embodiments, the top portion is transparent and the matter 630 can be observed during a preparation/heating process. In some embodiments, the chamber is at least partially opaque. For example, portions of the chamber may be opaque to prevent users from inadvertently touching the apparatus when the chamber is hot.

The top portion 610 and the bottom portion 612 may be made of a variety of materials. Materials may include glass, plastic, metal, compostable/fiber-based materials, or a combination of materials. The top portion 610 and the bottom portion 612 may be made of the same material or different materials. For example, the top portion 110 is metal while the bottom portion 112 is another material.

The seal 618 is adapted to join the top portion 610 to the bottom portion 612. In one aspect, the seal may provide an air-tight connection between the top portion and the bottom portion, defining a space enclosed within the top portion and the bottom portion. In some embodiments, in the space, matter 630 is isolated from an outside environment. The pressure inside the space may be different from atmospheric pressure. The seal may also prevent leakage and facilitate pressure buildup within the chamber in conjunction with pressure relief valve 620 and/or clamp of a heating apparatus (not shown).

In one aspect, a chamber formed by the top portion 610 and the bottom portion 612 may store and/or preserve food. For example, food may be vacuum-sealed inside the chamber. In another aspect, the chamber contains the food during a heating process. In various embodiments, the chamber can be directly be placed on a heating apparatus. For example, a user may obtain the chamber from a distributor (e.g., a grocery store), heat up the contents of the chamber without opening the chamber, and consume the contents of the chamber directly. In various embodiments, the same chamber stores/preserves food, is a transport vessel for the food, can be used to cook the food, and the food can be directly consumed from the chamber after preparation.

The metal layer 614 (also referred to as a conductive structure) heats in response to an electromagnetic (EM) source. In some embodiments, the metal layer heats by EM induction. The metal layer can heat matter 630. For example, heat in the metal layer may be conducted to the contents. As further described herein, the heating of the matter (in some cases in combination with a controlled level of moisture) in the chamber allows for a variety of preparation methods including dry heat methods such as baking/roasting, broiling, grilling, sautéing/frying; moist heat methods such as steaming, poaching/simmering, boiling; and combination methods such as braising and stewing. In various embodiments, several different heating methods are used in a single preparation process, e.g., the preparation process comprising a sequence of heating cycles.

The metal layer may be made of a variety of materials. In some embodiments, the metal layer includes an electrically conducting material such as a ferromagnetic metal, e.g., stainless steel. In various embodiments, the metal is processed and/or treated in various ways. For example, in some embodiments, the metal is ceramic-coated. In some embodiments, the metal layer is made of any metallic material, e.g., aluminum.

The membrane 616 (also referred to as a membrane region) is adapted to control an amount of liquid. For example, the membrane may provide controlled flow of moisture through the membrane. In various embodiments, the membrane may release liquids (e.g., water) inside a space defined by the top portion 610 and the bottom portion 612. For example, water can be released in a controlled manner and transformed to steam during a heating process. In various embodiments, the membrane may absorb liquids. For example, the membrane may absorb juices released by food during a heating process.

In some embodiments, the membrane 616 is adapted to provide insulation between the metal layer 614 and a surface of the bottom portion 612. For example, if the bottom portion is a glass plate, the membrane may prevent the glass plate from breaking due to heat.

The membrane 616 may be made of a variety of materials. In some embodiments, the membrane includes a heat-resistant spongy material such as open-cell silicone. In some embodiments, the membrane includes natural fiber and/or cellulose. The material may be selected based on desired performance, e.g., if the membrane is intended to absorb liquid or release liquid, a rate at which liquid should be absorbed/released, a quantity of liquid initially injected in the membrane, etc.

The pressure relief valve 620 regulates pressure in a space defined by the top portion 610 and the bottom portion 612. In various embodiments, the pressure relief valve relieves pressure buildup within the chamber. For example, in various embodiments the valve activates/deploys automatically in response to sensed temperature or pressure inside the chamber meeting a threshold. In some embodiments, the valve is activated by a heating apparatus for which the chamber is adapted. For example, the valve may be activated at a particular stage or time during a cooking process. The pressure relief valve allows the contents of the chamber to be heated at one or more pre-determined pressures including at atmospheric pressure. In various embodiments, this accommodates pressure heating techniques.

In some embodiments, the apparatus includes a handle 622. The handle may facilitate handling and transport of the apparatus. For example, the handle may enable a user to remove the apparatus from a base (e.g., from the heating apparatus 200 of FIG. 2). In various embodiments, the handle is insulated to allow safe handling of the apparatus when the rest of the apparatus is hot. In some embodiments, the handle is collapsible such that the apparatus is easily stored. For example, several apparatus may be stacked. FIG. 6 shows one example of the handle placement. The handle may be provided in other positions or locations.

In some embodiments, the apparatus includes an electronic tag 624. The electronic tag encodes information about the apparatus. By way of non-limiting example, the encoded information includes identification of matter 630, characteristics of the contents, and handling instructions. Using the example of a food package, the electronic tag may store information about the type of food inside the package (e.g., steak, fish, vegetables), characteristics of the food (e.g., age/freshness, texture, any abnormalities), and cooking instructions (e.g., sear the steak at high heat followed by baking at a lower temperature). Although shown below membrane 616, the electronic tag may be provided in other locations such as below handle 622, on a wall of the top portion 610, among other places.

The apparatus 600 may be a variety of shapes and sizes. In some embodiments, the shape of the apparatus is compatible with a heating apparatus such as heating apparatus 200 of FIG. 2. For example, the apparatus may be of a suitable surface area and shape to be heated by apparatus 200. For example, apparatus 600 may be around 7 inches in diameter and around 2 inches in height.

Figure 7:
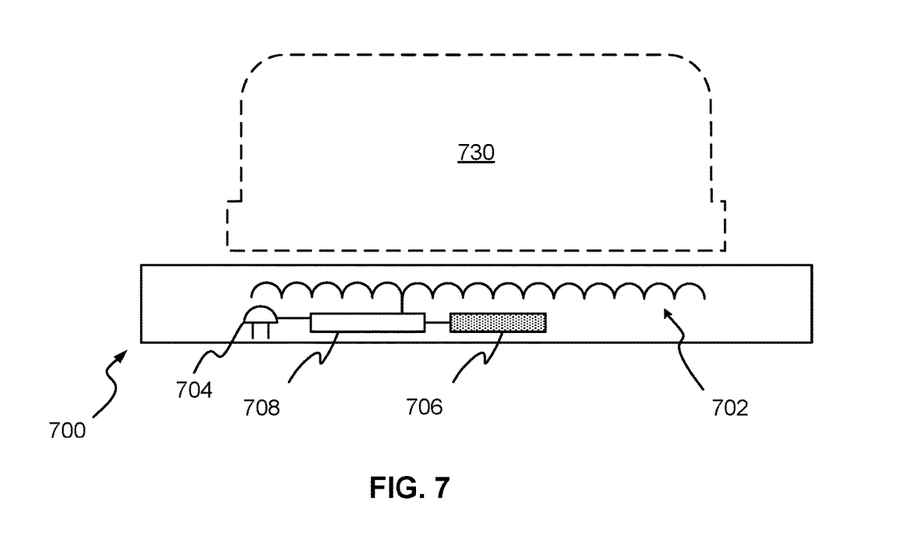
FIG. 7 is a block diagram illustrating an embodiment of an apparatus for heating.

FIG. 7 is a block diagram illustrating an embodiment of an apparatus 700 for heating. For example, in various embodiments the heating apparatus 700 is adapted to receive an apparatus 730 (also referred to as a chamber) and heat contents of the chamber 730. An example of the chamber 730 is apparatus 100 of FIG. 1. The heating apparatus 700 includes an EM source 702, one or more sensors 704, electronic tag reader 706, and controller 708.

The EM source 702 heats electrically conductive materials. In various embodiments, the EM source is an RF source that provides inductive heating of metals such as ferromagnetic or ferrimagnetic metals. For example, the EM source 702 may include an electromagnet and an electronic oscillator. In some embodiments, the oscillator is controlled by controller 708 to pass an alternating current (AC) through an electromagnet. The alternating magnetic field generates eddy currents in a target such as metal layer 614 of FIG. 6, causing the metal layer to heat. Heating levels and patterns may be controlled by the frequency of the AC and when to apply the AC to the electromagnet as further described herein.

The sensor(s) 704 are adapted to detect characteristics of contents of chamber 730 including any changes that may occur during a heating process. A variety of sensors may be provided including a microphone, camera, thermometer, and/or hygrometer, etc. A microphone may be configured to detect sounds of the matter being heated. A camera may be configured to detect changes in the appearance of the matter being heated, e.g., by capturing images of the matter. A hygrometer may be configured to detect steam/vapor content of the chamber. For example, the hygrometer may be provided near an opening or pressure relief valve such as valve 620 of FIG. 6 to detect moisture escaping the chamber. The information captured by the sensors may be processed by controller 708 to determine a stage in the cooking process or a characteristic of the matter being heated as further described herein. In this example, the sensor(s) are shown outside the chamber 730. In some embodiments, at least some of the sensor(s) are provided inside the chamber 730.

The electronic tag reader 706 reads information about contents of the chamber 730 such as characteristics of packaged food. The information encoded in the tag may include properties of the contents, instructions for preparing/heating the contents, etc. In various embodiments, the electronic tag reader is configured to read a variety of tag types including barcodes, QR codes, RFIDs and any other tags encoding information.

The controller 708 controls operation of the heating apparatus 700. An example of the controller is controller 808 of FIG. 8. In various embodiments, the controller executes instructions for processing contents of chamber 730. In some embodiments, the instructions are obtained from reading an electronic tag of the chamber 730 via the electronic tag reader 706. In some embodiments, the controller requests instructions from a remote server based on the contents. The controller controls the EM source 702 to implement heating levels and patterns, e.g., activating the electromagnet to carry out the heating instructions.

In some embodiments, the apparatus includes one or more network interfaces (not shown). A network interface allows controller 708 to be coupled to another computer, computer network, or telecommunications network using a network connection as shown. For example, through the network interface, the controller 708 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) controller 708 can be used to connect the heating apparatus 700 to an external network and transfer data according to standard protocols. For example, various process embodiments disclosed herein can be executed on controller 708, or can be performed across a network such as the Internet, intranet networks, or local area networks, in conjunction with a remote processor that shares a portion of the processing. Additional mass storage devices (not shown) can also be connected to controller 708 through the network interface.

In some embodiments, the apparatus includes one or more I/O devices (not shown). An I/O device interface can be used in conjunction with heating apparatus 700. The I/O device interface can include general and customized interfaces that allow the controller 708 to send and receive data from other devices such as sensors, microphones, touch-sensitive displays, transducer card readers, tape readers, voice or handwriting recognizers, biometrics readers, cameras, portable mass storage devices, and other computers.

In various embodiments, controller 708 is coupled bi-directionally with memory (not shown), which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on controller 708. Also as is well known in the art, primary storage typically includes basic operating instructions, program code, data and objects used by the controller 708 to perform its functions (e.g., programmed instructions). For example, memory can include any suitable computer-readable storage media, described below, depending on whether, for example, data access needs to be bi-directional or uni-directional. For example, controller 708 can also directly and very rapidly retrieve and store frequently needed data in a cache memory (not shown).

In some embodiments, the controller implements the heating instructions based on sensor readings. The controller may determine that a heating stage is complete, e.g., the food has reached a desired state, based on sensor readings. For example, when a level of moisture inside the chamber 730 drops below a threshold, a Maillard reaction begins and the food becomes browned. The Maillard reaction may be indicated by a characteristic sound (e.g., sizzling). For example, in various embodiments, the controller determines a characteristic of the food being prepared using signals collected by the sensor(s) 704. The controller receives a sensor reading from the microphone and/or other sensors and determines that the Maillard reaction has begun based on the sensor reading meeting a threshold or matching a profile. For example, the color of food may indicate whether the food has been cooked to satisfaction. The controller receives a sensor reading from the camera and/or other sensors and determines that food has been cooked to a desired level of tenderness based on the sensor reading meeting a threshold or matching a profile.

The controller may adjust a heating stage or a heating power level based on sensor readings. For example, in various embodiments at the end of a default heating time indicated by heating instructions, the controller checks sensor readings. The sensor readings indicate that the food is not sufficiently browned. The controller may then extend the heating time such that the food is more browned.

In various embodiments, the heating apparatus includes a cradle or support for apparatus 100. For example, the support may be separated from the heating apparatus, the apparatus 100 inserted into the support, and the support returned to the heating apparatus. The support may support a circumference/walls of apparatus 100.

In various embodiments, the heating apparatus includes a switch (not shown). The switch may power on the heating apparatus and/or receive user input to begin a heating process. In various embodiments, the switch is provided with a visual indicator of progress of a heating process. For example, the switch may be provided at the center of a light "bulb," where the light bulb includes one or more colored lights (e.g., LED lights). The light "bulb" may change colors during the heating process, acting like a timer. For example, at the beginning of a heating process, the bulb is entirely be red. As the heating process progresses, the light gradually turns green (e.g., segment by segment) until the light is entirely green, indicating completion of a heating stage or heating process. The light may gradually turn green segment by segment as if with the sweeping of a second hand of a clock, where a section to the left of the hour and minutes hands is red and a section to the right of the hour and minute hands is green until both hands are at 12:00 and the bulb is entirely green.

In various embodiments, the heating apparatus may include a user interface to display and/or receive user input. For example, a current power/energy level of a heating phase may be displayed on the user interface. In some embodiments, the energy levels are categorized Level 1 to Level 6 and a current power level of a heating phase is displayed on the user interface. The categorization may facilitate user comprehension of the energy level. Power/energy levels may be represented in an analog or continuous manner in some embodiments.

The heating apparatus 700 may be a variety of shapes. For example, heating apparatus 700 may be around 9 inches in diameter and around 2 inches in height. In some embodiments, the shape of the apparatus is compatible with an apparatus such as chamber 600 of FIG. 6. For example, the apparatus may be of a suitable surface area and shape to heat the contents of chamber 600.

Figure 8:
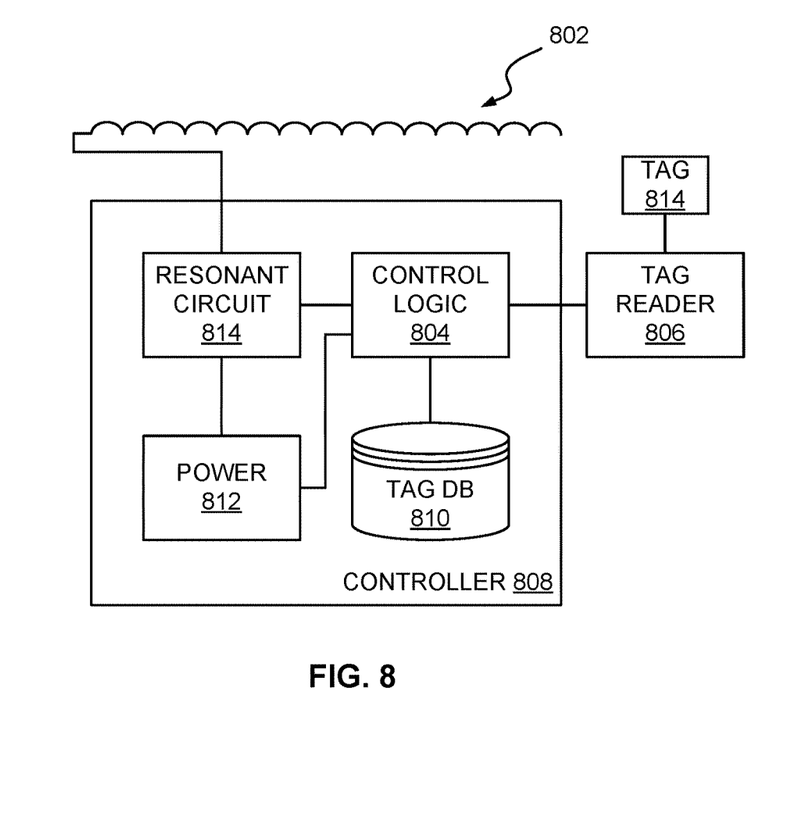
FIG. 8 is a block diagram of an embodiment of a controller for a heating apparatus.

FIG. 8 is a block diagram of an embodiment of a controller 808 for a heating apparatus. For example, the controller may be provided in heating apparatus 700 of FIG. 7. The controller 808 includes control logic 804, a tag database 810, resonant circuit 814, and power 812. In this example, the controller 808 is communicatively coupled to EM source 802 and tag reader 806.

The tag reader 806 reads a tag 814. The tag 814 may encode information about contents of a chamber. For example, the tag 814 may be encoded by process 200 of FIG. 2. An example of tag reader 806 is electronic tag reader 706 of FIG. 7.

The control logic 804 is configured to receive tag information from the tag reader 806 and determine one or more heating cycles based on the tag information. In some embodiments, the control logic determines heating cycle(s) by looking up an association between the tag information and stored heating cycles. For example, the control logic may determine heating cycle(s) adapted to properties of a chamber in which the heatable load is provided and/or characteristics of the heatable load. In various embodiments, the control logic executes one or more processes such as heating schedules/cycles corresponding to FIG. 3.

In some embodiments, the control logic is implemented by one or more processors (also referred to as a microprocessor subsystem or a central processing unit (CPU)). For example, the control logic 804 can be implemented by a single-chip processor or by multiple processors. In some embodiments, a processor is a general purpose digital processor that controls the operation of the heating apparatus 700. Using instructions retrieved from memory, the processor controls the reception and manipulation of input data, and the output and display of data on output devices.

The tag database 810 stores associations between heatable loads and heating cycles. For example, energy level, duration, and other properties of heating cycles may be stored in association with a load or characteristic(s) the load. In various embodiments, the associations are pre-defined and loaded into the database. In various embodiments, the associations are refined based on machine learning, user feedback, and/or sensor readings of heatable load properties before, during, or after a heating cycle. Although shown as part of the controller 808, the tag database may instead be external to the controller.

The resonant circuit 814 controls the EM source 802. In some embodiments, the resonant circuit 814 has an integrated EM source 802, e.g., an inductor coil (not shown). In some embodiments, the EM source is a separate element from the resonant circuit 814.

The power 812 is input to the resonant circuit 814. In various embodiments, power 812 is a DC source. The DC source may be an internal or external DC source or may be adapted from an external AC source. Although shown as an internal source, the power may instead be external to the controller 808.

In operation, tag reader 806 read tag information from tag 814, and sends the information to the control logic 804. The control logic 804 maps the received tag information to one or more heating cycles using associations stored in tag database 810. The control logic 804 then instructs the resonant circuit 814 to execute the heating cycles. For example, the control logic 804 may also control when power 812 is provided to the resonant circuit 814. Resonant circuit 814 then activates the EM source 802.

Figure 9:
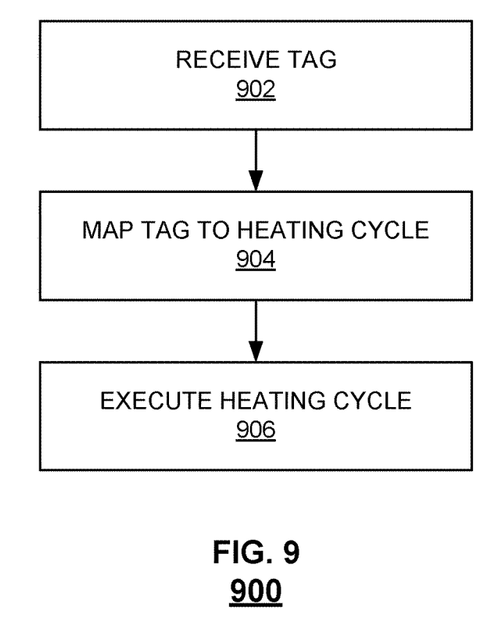
FIG. 9 is a flowchart illustrating an embodiment of a process to operate an automatic heating system.

FIG. 9 is a flowchart illustrating an embodiment of a process 900 to operate an automatic heating system. In various embodiments, the process 900 may be implemented by a processor such as control logic 808 of FIG. 8.

A tag is received (902). In various embodiments, the tag is an electronic tag associated with a heatable load. Tag 624 of FIG. 6 is an example of a tag encoding information about matter 630. Returning to FIG. 9, the tag is mapped to a heating cycle (904). In various embodiments, the tag is mapped by looking up an association between the tag and heating cycles. The heating cycles may be adapted for characteristics of a heatable load. The heating cycle may be defined by a duration and an energy level as further described herein. Upon determination of one or more heating cycles, the heating cycle(s) is executed (906). For example, in various embodiments control logic instructs a resonant circuit, e.g., 814 of FIG. 8, to drive an EM source, e.g., 802 of FIG. 8.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving at least one sensor reading associated with food;
   determining at least one characteristic of the food based on the at least one sensor reading;
   generating cooking instructions for the food based on the at least one characteristic;
   determining a quantity of liquid to inject into a packaging of the food, wherein the liquid is controllably released during cooking;
   instructing a packager to package the food based at least in part on the generated cooking instructions and the determined quantity of liquid; and
   storing data that associates the cooking instructions with the food.

2. The method of claim 1, wherein the cooking instructions includes a sequence of cooking phases, including at least one of:
   duration of each of the cooking phases;
   an energy level for each of the cooking phases; and
   a response to an event that occurs during at least one of the cooking phases.

3. The method of claim 1, wherein the sensor reading includes at least one of: spectroscopy, image analysis, fluorescence, MM, and X-ray.

4. The method of claim 1, wherein the sensor reading includes at least one of: terahertz radiation and thermal radiation.

5. The method of claim 1, wherein the sensor reading includes at least one of: a chemically-sense reading and gas analysis.

6. The method of claim 1, wherein the sensor reading includes at least one of: a mechanical, a sonic, and an ultrasonic reading.

7. The method of claim 1, wherein the determination of at least one characteristic of the food includes at least one of: maturity and freshness.

8. The method of claim 1, wherein the determination of at least one characteristic of the food includes at least one of: water content, nitrogen content, and protein content.

9. The method of claim 1, wherein the determination of at least one characteristic of the food includes at least one of: fat content, sugar content, and acidity.

10. The method of claim 1, wherein the determination of at least one characteristic of the food includes at least one of: size, volume, weight, and shape.

11. The method of claim 1, wherein the determination of at least one characteristic of the food includes a type of the food and the generation of the cooking instructions is adapted to the type of food.

12. The method of claim 1, wherein the generation of the cooking instructions is adapted to at least one characteristic of the food.

13. The method of claim 1, wherein the storing the cooking instructions includes storing the instructions to a server.

14. The method of claim 1, wherein the storing the cooking instructions includes encoding the instructions in an electronic tag.

15. The method of claim 1, wherein the liquid is water.

16. The method of claim 1, wherein the instructing the packager to package the food includes injecting the determined quantity of liquid into a membrane with which the food is packaged.

17. The method of claim 1, further comprising determining when to release a substance during at least one cooking phase corresponding to the cooking instructions.

18. The method of claim 1, further comprising determining when to release the liquid during at least one cooking phase corresponding to the cooking instructions.

19. A system comprising:
   a processor configured to:
      receive at least one sensor reading associated with food;
      determine at least one characteristic of the food based on the at least one sensor reading;
      generate cooking instructions for the food based on the at least one characteristic;
      determine a quantity of liquid to inject into a packaging of the food, wherein the liquid is controllably released during cooking;
      instruct a packager to package the food based at least in part on the generated cooking instructions and the determined quantity of liquid; and
      store data that associates the cooking instructions with the food; and
   a memory coupled to the processor and configured to provide the processor with instructions.

20. A computer program product, the computer program product being embodied in a non-transitory computer readable storage medium and comprising computer instructions for:
  receiving at least one sensor reading associated with food;
  determining at least one characteristic of the food based on the at least one sensor reading;
  generating cooking instructions for the food based on the at least one characteristic;
  determining a quantity of liquid to inject into a packaging of the food, wherein the liquid is controllably released during cooking;
  instructing a packager to package the food based at least in part on the generated cooking instructions and the determined quantity of liquid; and
  storing data that associates the cooking instructions with the food.

* * * * *

UNITED STATES PATENT AND TRADEMARK OFFICE
CERTIFICATE OF CORRECTION

PATENT NO. : 10,061,285 B1
APPLICATION NO. : 15/489468
DATED : August 28, 2018
INVENTOR(S) : Thrun et al.

Page 1 of 1

It is certified that error appears in the above-identified patent and that said Letters Patent is hereby corrected as shown below:

In the Claims

In Column 14, Claim 3, Line 3, delete "MM" and insert --MRI--, therefor.

Signed and Sealed this
Twenty-second Day of January, 2019

Andrei Iancu
*Director of the United States Patent and Trademark Office*